United States Patent [19]
Kando et al.

[11] Patent Number: 5,871,082
[45] Date of Patent: Feb. 16, 1999

[54] ORIENTATION PARTS FEEDER

[75] Inventors: Akiyoshi Kando; Wataru Matsushima, both of Toyama-Ken, Japan

[73] Assignee: YKK Corporation, Tokyo, Japan

[21] Appl. No.: 759,428

[22] Filed: Dec. 5, 1996

[30]     Foreign Application Priority Data

Dec. 6, 1995 [JP] Japan .................................. 7-317733

[51] Int. Cl.⁶ .................................................. B65G 43/08
[52] U.S. Cl. ......................... 198/751; 198/395; 198/380; 198/464.4; 198/752.1; 198/444; 198/766
[58] Field of Search .................................. 198/380, 395, 198/464.4, 751, 752.1, 766, 444

[56]                References Cited

U.S. PATENT DOCUMENTS

| | | |
|---|---|---|
| 2,052,179 | 8/1936 | Hopkinson et al. . |
| 3,101,832 | 8/1963 | Wyle et al. ............................. 198/380 |
| 3,282,397 | 11/1966 | Grunwald ............................... 198/365 |
| 3,295,661 | 1/1967 | Mitchell et al. ........................ 198/444 |
| 3,526,310 | 9/1970 | Tessmer ................................. 198/395 |
| 4,333,558 | 6/1982 | Nonaka et al. ......................... 198/395 |
| 4,819,784 | 4/1989 | Sticht ..................................... 198/395 |
| 4,960,360 | 10/1990 | Giannuzzi et al. ..................... 198/380 |
| 5,513,739 | 5/1996 | Berg ....................................... 198/380 |

FOREIGN PATENT DOCUMENTS

| | | |
|---|---|---|
| 1 294 874 | 5/1969 | Germany . |
| 218 332 A1 | 2/1985 | Germany . |
| 406056251 | 3/1994 | Japan ................................. 198/752.1 |
| 406135531 | 5/1994 | Japan ................................. 198/752.1 |
| 414764 | 5/1974 | U.S.S.R. ................................. 198/395 |

OTHER PUBLICATIONS

"Patent Abstracts of Japan", vol. 9, No. 294, 20, Nov. 1985.

*Primary Examiner*—William E. Terrell
*Assistant Examiner*—Patrick Mackey
*Attorney, Agent, or Firm*—Hill & Simpson

[57]                    ABSTRACT

An orientation parts feeder for successively feeding parts wherein each part has an irregular cross section. The feeder includes a rotating drum supported for rotation about a substantially horizontal axis. The drum has on its inner cylindrical surface a plurality of circumferentially spaced wing plates, a transfer chute having a longitudinal parts guide channel, and a first and a second incorrectly-oriented-parts discriminating and removing mechanism disposed in succession on a downstream end portion of the parts guide channel. The first incorrectly-oriented-parts discriminating and removing mechanism has a response time which is shorter than that of the second incorrectly-oriented-parts discriminating and removing mechanism. The feeder is able to remove parts having undesirable postures with sufficient reliability and stability to ensure a high speed conveyance of the parts.

5 Claims, 7 Drawing Sheets

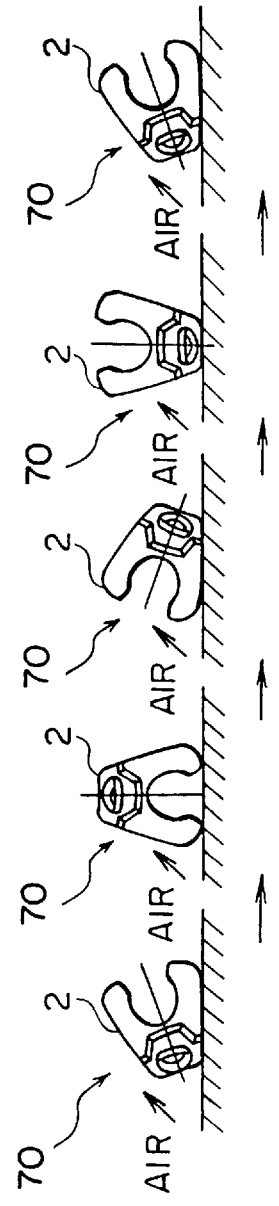

ORIENTATION PARTS FEEDER

BACKGROUND OF THE INVENTION

1. Field of the Invention:

The present invention relates generally to a parts feeder of the type wherein parts held in a rotating drum provided in place of a conventional bowl are fed in order along a linear passage at high speed and with reliability for conveyance to the next processing operation, and more particularly to a parts feeder which is suitable for use with various parts having irregular cross sections and requiring orientation in conveyance.

2. Description of the Prior Art:

In the production of a slide fastener or the like article composed of a plurality of parts of different configurations, the parts are supplied to an assembling station in the order prescribed by an assembling schedule, and each of the parts thus supplied is then assembled onto a predetermined position while keeping the same posture. In connection with this assembling operation, a parts feeder as disclosed in Japanese Patent Laid-open Publication No. HEI 5-178447 is generally used for conveyance of small parts. The disclosed parts feeder is of the bowl type including a bottomed vibrating bowl with a spiral parts feed passage on an inside wall surface thereof, and a plate-like chute interconnecting an outlet of the parts feed passage in the bowl and a parts supplying portion of the next processing station.

As an another example, U.S. Pat. No. 2,052,179 discloses a parts feeder for feeding fastener elements for a slide fastener. The disclosed parts feeder includes a horizontal drum driven to rotate in one direction about a substantially horizontal axis, a downwardly inclined tubular chute extending from the inside of the horizontal drum to the outside of the same along the axis of the horizontal drum. An inner cylindrical wall surface of the horizontal drum is provided with a plurality of wing plates circumferentially spaced at predetermined intervals and projecting radially inwardly at predetermined angles toward the axis of the horizontal drum. Upon rotation of the horizontal drum, the parts held in batches in the horizontal drum are scooped or taken up by the wing plates and when the wing plates reach an upper oblique position of the drum, the parts slide down from the wing plates onto a tray and then received in a longitudinal slit formed in an upper surface of the tubular chute.

Thereafter, the parts slides down along the slit of the tubular chute for conveyance to a delivery chute connected to the next processing station. In this instance, if parts while being fed down the tubular chute has an undesired posture or orientation, the parts will to move into the internal space of the tubular chute and then fall down to the outside of the tubular chute through a discharge hole formed in a portion of a bottom surface of the tubular chute.

The bowl type parts feeder shown in Japanese Patent Laid-open Publication No. HEI 5-178447 has a drawback in that since conveyance of the parts relies on vibration of the bowl in the circumferential direction thereof, not only the parts are unlikely to move or advance smoothly along the spiral feed passage, but also it is difficult to advance the parts on the feed passage smoothly. The bowl type part feeder, therefore, has a limitation or difficulty in increasing the parts conveyance speed. Furthermore, it is doubtful that the parts can be reliably transferred from the spiral feed passage to the plate-like chute.

The drum-type parts feeder disclosed in U.S. Pat. No. 2,052,179 has no means for positively advancing the parts. Instead, the parts simply slide down the chute by their own weights while they are guided in the slit of the tubular chute. Accordingly, smooth conveyance of the parts is difficult to achieve, and the parts conveyance speed cannot be increased. Further, depending on the shape of parts to be conveyed, the number of parts which can be received in the slit may be limited, thus lowering the productivity. The disclosed drum type parts feeder cannot make a discrimination between the front and the reverse of the respective parts to be fed, so that it can not recognize and remove parts in reverse or wrong postures. Accordingly, the parts feeder is not suitable for use with parts, such as fastener elements for a slide fastener, which require orientation in conveyance.

SUMMARY OF THE INVENTION

With the foregoing problems in view, it is an object of the present invention to provide an orientation parts feeder which is capable of feeding parts reliably and smoothly while keeping them in a desired posture or orientation, and is able to realize a high speed conveyance and a reliable operation over a prolonged period of use.

To attain the foregoing object, an orientation parts feeder of this invention for successively feeding parts each having an irregular cross section while keeping them in identical postures, comprising: a transfer chute of an elongated rectangular bar having a longitudinal parts guide channel in its one side; a vibration generating means supporting thereon the transfer chute for vibrating the transfer chute in a longitudinal direction thereof; and a first and a second incorrectly-oriented-parts discriminating and removing means disposed on the transfer chute in succession toward a downstream end of the parts guide channel for discriminating and removing parts of undesired postures from the parts guide channel. The first incorrectly-oriented-parts discriminating and removing means discriminates and removes the parts of the undesired postures while they are fed down the parts guide channel, and the second incorrectly-oriented-parts discriminating and removing means detects the parts of the undesired postures which have passed the first incorrectly-oriented-parts discriminating and removing means, so as to stop the detected parts of the undesired posture and then removes the thus stopped parts.

In order to provide a higher conveyance speed, the transfer chute is preferably inclined downward toward a direction of conveyance of the parts.

It is further preferable that the first incorrectly-oriented-parts discriminating and removing means includes at least two parts detecting means, and a single parts removing means. In this instance, said at least two parts detecting-means are positioned such that if any of the parts in conveyance has a desired posture, it is detected by each one of said at least two parts detecting means separately, and if any of the parts in conveyance has an undesired posture, it is detected simultaneously by said at least two parts detecting means. The parts removing means includes an air blast mechanism operable, in response to coexisting detection signals from said at least two parts detecting means, to eject air against the parts of the undesired posture.

The second incorrectly-oriented-parts discriminating and removing means preferably includes a parts blocking member disposed at the parts guide channel for adjusting a restricted passageway of the parts to prevent passage of the parts of the undesired postures while allowing the passage of the parts of a desired posture, a parts removing member retractably movable into the restricted passageway defined by the parts blocking member, a parts detecting means disposed downstream of the parts removing member for detecting the arrival of the parts, and an actuating means for allowing the parts removing member to move into the restricted passageway when detection of the arrival of each of the parts by the parts detecting means does not take place within a predetermined time period.

With the orientation parts feeder thus constructed, a great number of parts received in a rotating drum, upon its rotation, are scooped or taken up by means of wing plates provided on an inside surface of the rotating drum. When each of the wing plates reach an upper oblique position of the rotating drum, the parts slide down the wing plate and are received in the parts guide channel of the transfer chute held in a backwardly tilted position. In this instance, since the transfer chute is vibrated in its longitudinal direction by means of the vibrating unit, the parts can be advanced smoothly and positively along the parts guide channel. In the case where the parts sliding down along guide surfaces of the parts guide channel are all oriented correctly or have a desired posture, none of them are detected, as incorrectly oriented parts, by the first and second incorrectly-oriented-parts discriminating and removing means. Thus, while keeping the desired posture, they are fed into a vertical chute via a quarter-circular parts-feed-direction changing member for conveyance to the next processing operation.

If one of the parts being fed down the transfer chute has an undesired posture or orientation, light beams projected from two light projectors toward a light detector (constituting jointly with the light projectors the aforesaid at least two parts detecting means of the first incorrectly-oriented parts discriminating and removing means) are simultaneously blocked by one of the parts. In this instance, the luminous energy detected by the light detector falls below a predetermined value. If such a low luminous energy condition still continues even after a lapse of the predetermined time period, the air blast mechanism is activated to eject compressed air toward the one of the parts for a predetermined period of time. In practice, by virtue of the first incorrectly-oriented-parts discriminating and removing means, the greater part of the incorrectly oriented parts (i.e., parts having undesired postures) are discharged from the parts guide channel to the outside of the orientation parts feeder as they travel down the parts guide channel.

However, it may occur that a correctly oriented parts, i.e., parts having the desired posture, coming just before or next to the incorrectly oriented parts, are either removed together with the incorrectly oriented part, or forcibly displaced or incorrectly oriented to assume an undesired postures by the effect of the compressed air ejected from the air blast mechanism of the first incorrectly-oriented-parts discriminating and removing means. In the latter case, when each of the forcibly incorrectly oriented parts after having passed the first incorrectly-oriented-parts discriminating and removing means passes the second incorrectly-oriented-parts discriminating and removing means. Passage of the incorrectly oriented parts are blocked by the parts blocking member, and an electric signal which has been sent periodically from the parts detecting means disposed downstream of the parts blocking member, to a control units disappears or terminates. If the electric signal still missing at the end of a predetermined time period, it is judged that the passage of the incorrectly oriented parts are blocked by the parts blocking member. Based on this judgment, the parts removing means is activated to mechanically thrust the blocked parts off from the parts guide channel.

The orientation parts feeder may further include a parts orienting means disposed on the parts guide channel at an upstream side of the first and second incorrectly-oriented-parts discriminating and removing means for orienting the parts into the desired posture. In this instance, the parts orienting means preferably comprises an air blast mechanism.

The downstream end of the transfer chute may be connected via an arcuate parts-feed-direction changing passage to a vertical chute for conveyance of the parts to the next processing operation. In this instance, the first and second incorrectly-oriented-parts discriminating and removing means are disposed in succession on a downstream end portion of the transfer chute. It is preferable that the arcuate parts-feed-direction changing passage is a part or segment of a circular groove formed in a curved surface of a hollow circular truncated cone. The hollow circular truncated cone is divided into a plurality of segment members each having an arcuate groove which forms the parts-feed-direction changing passage.

The orientation parts feeder may further include a parts discharge hole formed in a guide surface of the parts guide channel at a position between the second incorrectly-oriented-parts discriminating and removing means and the arcuate parts-feed-direction changing passage so as to allow parts of undesired postures which could not have been removed even by the second incorrectly-oriented-parts discriminating and removing means, to fall down by their own weights to the outside of the transfer chute. Thus, all the parts having undesired postures can be reliably removed before they reach the arcuate parts-feed-direction changing passage.

The above and other objects, features and advantages of the present invention will become manifest to those versed in the art upon making reference to the detailed description and accompanying sheets of drawings in which a preferred structural embodiment incorporating the principles of the present invention is shown by way of illustrative example.

BRIEF DESCRIPTION OF THE DRAWINGS

FIGS. 6A through 6E are views illustrative of the manner in which parts having undesired postures are oriented into a desired posture by a parts orienting means disposed at an upstream side of the first incorrectly-oriented-parts discriminating and removing means;

DETAILED DESCRIPTION OF THE PREFERRED EMBODIMENT

Figure 1:
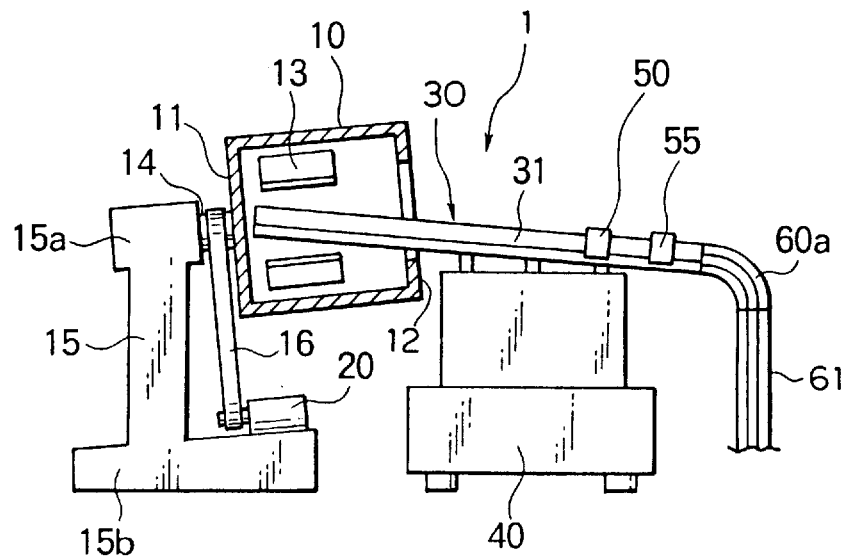
FIG. 1 is a front elevational view, partly in cross section, of an orientation parts feeder according to a typical embodiment of the present invention.

A preferred embodiment of the present invention will be described below with reference to the accompanying drawings. FIG. 1 shows, in side view with parts in cross section, a general construction of the orientation parts feeder 1 according to the present invention. This embodiment illustrates an apparatus for continuously conveying metal fastener elements for a slide fastener.

The orientation parts feeder 1 includes a rotating drum rotatable about a rotating shaft 14 inclined upwardly at a slight angle to the horizontal, an electric motor 20 for rotatably driving the rotating drum 10, a transfer chute 30 in a form of an elongated rectangular bar along which a multiplicity of fastener elements 2 held in the rotating drum 10 are fed or conveyed to the outside of the rotating drum 10 while keeping a desired posture or orientation in a manner described later, a vibrating unit 40 for vibrating the transfer chute 30 in its longitudinal direction, and first and second incorrectly-oriented-parts discriminating and removing units 50 and 55 for removing fastener elements 2 having undesired postures or orientations from the transfer chute 30 while they are fed down the transfer chute 30.

The rotating drum 10 has a hollow cylindrical shape and includes a bottom plate 11 at one end, and an open end 12 at the opposite end. The rotating drum 10 includes a plurality of wing plates 13 extending parallel to the axis of rotation of the drum 10 and being circumferentially spaced at regular intervals, and projecting radially inwardly from an inner cylindrical wall of the drum 10 toward the axis. The thus constructed rotating drum 10 is rotatably disposed, with its bottom plate 11 facing obliquely and downwardly at a predetermined angle, and with its open end 12 facing upwardly and obliquely. By virtue of such an inclination of the rotating drum 10, the fastener elements 2 held in the rotating drum 10 tend to automatically gather together at the bottom plate 11 so that an adequate quantity of fastener elements 2 to be transported by the wing 13 can be reserved.

The rotating shaft 14 projects outwardly from the center of the bottom plate 11 of the rotating drum 10 and is rotatably supported on an upper supporting portion 15a of a support frame 15 while keeping the predetermined angle of inclination. The rotating shaft 14 is connected by an endless belt 16 to the electric motor 20 disposed on a lower base 15b of the support frame 15. Upon rotation of the electric motor 20, the rotating drum 10 is rotated about an axis of the rotating shaft 14 at a predetermined speed. The electric motor 20 may be provided with a non-illustrated built-in speed reducer.

The transfer chute 30 is composed of an elongated rectangular bar, as described above, and has one end (upstream end) inserted into the rotating drum 10 through the open end 12 and terminating short of the bottom plate 11. The opposite end (downstream end) of the chute 30 is connected via an arcuate (quarter-circular) parts-feed-direction changing member 60 to a vertical chute 61 leading to the next processing station. The transfer chute 30 as a whole is inclined slightly downwardly toward the joint portion between itself and the vertical chute 61. Further, the transfer chute 30 has a front surface tilted at an angle of 45°–60° and having a stepped longitudinal parts guide passage thereon and extending throughout the length of the transfer chute 30.

Figure 8:
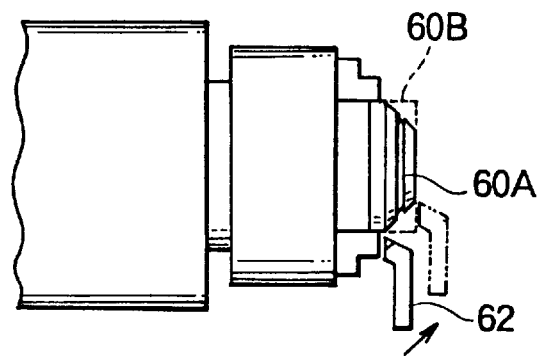
FIG. 8 is a view showing the manner in which an arcuate parts-feed-direction changing member interconnecting the transfer chute and a vertical chute is manufactured.

The quarter-circular parts-feed-direction changing member 60 in this embodiment has a longitudinal parts-feed-direction changing passage 60a formed simply by cutting. FIG. 8 schematically illustrates the manner in which the parts-feed-direction changing member 60 is produced. As illustrated in this figure, a short cylindrical metal material 60B while being rotated about its axis is shaped into a hollow circular truncated cone by means of a bite 62, during which a continuous circular groove 60A is formed or cut in an intermediate portion of a circumferential surface of the truncated cone. The grooved hollow circular truncated cone thus obtained is then divided into four equal segments each of which forms the aforesaid arcuate (quarter-circular) parts-feed-direction changing member 60.

Figure 9:
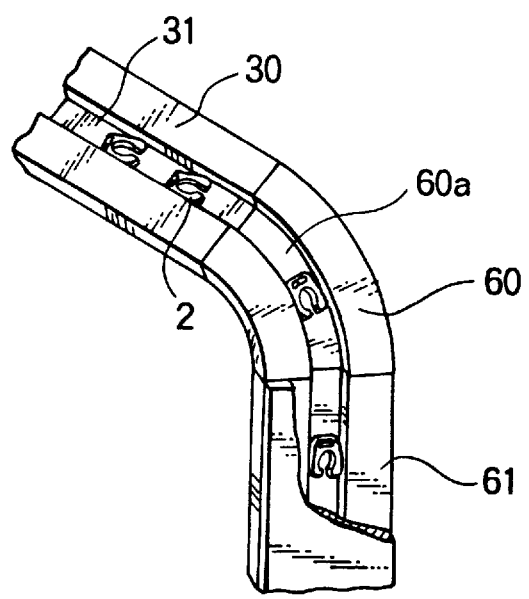
FIG. 9 is an enlarged perspective view showing the arcuate parts-feed-direction changing member joined with the transfer chute and the vertical chute.

FIG. 9 is a schematic perspective view showing the transfer chute 30 and the vertical chute 61 joined together with the parts-feed-direction changing member 60 disposed therebetween. As will be understood from this figure, the fastener elements 2 are first slid down in the parts guide channel 31 while being supported in a backward tilted position by the tilted front surface of the parts guide channel 31. Then they are gradually placed into an upright position as they travel through the arcuate passage 60a in the parts-feed-direction changing member 60, and finally slid down the vertical chute 61.

According to this invention, in order to advance the fastener elements 2 positively along the parts guide channel 31 of the transfer chute 30 as soon as they are received in the parts guide channel 31 disposed inside the rotating drum 10, the transfer chute 30 is vibrated in the longitudinal direction thereof. According to the illustrated embodiment (see FIG. 1), the transfer chute 30 is supported by the vibrating unit 40 at the outside of the rotating drum 10 so that the transfer chute 30 is directly vibrated by the vibrating unit 40. The vibrating unit 40 may be either an electromagnetic vibrator or a mechanical vibrator, both being readily available in the market. By virtue of the vibration by the vibrating unit 40 and the downward inclination of the transfer chute 30, the fastener elements 2 are smoothly advanced down along the parts guide channel 31 at considerably high speeds.

According to the illustrated embodiment, the first and second incorrectly-oriented-parts discriminating and removing means 50, 55 are disposed in succession on a downstream end portion of the parts guide channel 31 of the transfer chute 30 for discriminating and removing the fastener elements 2 being conveyed in incorrect postures other than the predetermined desired posture. Such a series arrangement of the first and second incorrectly-oriented-parts discriminating and removing means 50, 55 at the downstream end portion of the parts guide channel 31 of the transfer chute 30 is applied for the purpose of securing a reliable orientation of the parts (fastener elements 2) at the final stage of transport to the next processing operation. The first and second incorrectly-oriented-parts discriminating and removing means 50, 55 perform a two-stage discrimination and removing of the incorrectly oriented parts (fastener elements 2) which will considerably improve the parts orientation accuracy. More specifically, the first incorrectly-oriented-parts discriminating and removing means 50 is provided for achieving an efficient discrimination and removing of incorrectly oriented fastener elements 2 from a multiplicity of all the correctly or incorrectly oriented fastener elements 2 fed in succession down the transfer chute 30, and the second incorrectly-oriented-parts discriminating and removing means 55 is provided for achieving a reliable discrimination and removing of the incorrectly oriented fastener elements 2 which could not have been discriminated and removed by the first incorrectly-oriented-parts discriminating and removing means 50.

To this end, the first incorrectly-oriented-parts discriminating and removing means 50 includes a photoelectric detector 51 and an air blast mechanism (parts removing means) 54 operative in quick response to detection signals from the photoelectric detector 51 for ensuring that a incorrectly oriented fastener element 2 can be discriminated and removed efficiently at high speeds. On the other hand, the second incorrectly-oriented-parts discriminating and removing means 55 has a lower response speed than the first incorrectly-oriented-parts discriminating and removing means 50 but includes a mechanical discriminating and removing mechanism which is capable of securing a highly reliable discrimination and removing of the incorrectly oriented fastener elements 2.

Figure 2:
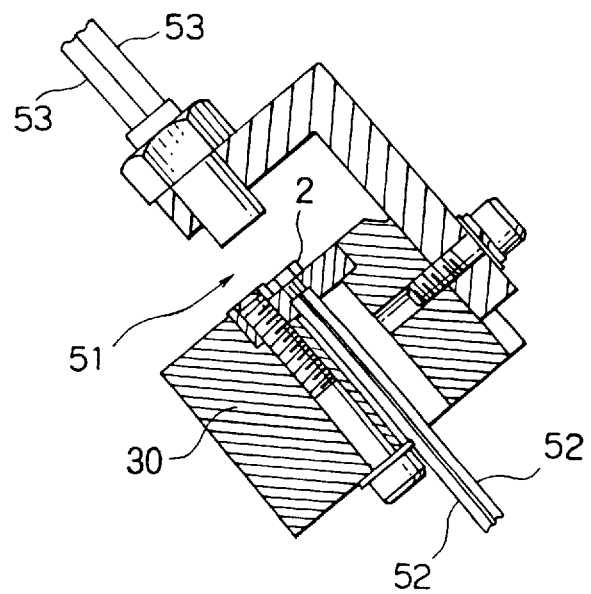
FIG. 2 is a cross-sectional view taken at a position in which a first incorrectly-oriented-parts discriminating and removing means of the orientation parts feeder is disposed.

For the first incorrectly-oriented-parts discriminating and removing means 50, a mechanism disclosed in Japanese Patent Laid-open Publication No. SHO 60-132822 may be employed. However, according to the illustrated embodiment, the photoelectric detectors 51 are used in combination to make a discrimination between incorrectly oriented fastener elements 2 and correctly oriented fastener elements 2. As shown in FIG. 2, the discriminating mechanism of the detector 51 is composed of two light sources or projectors 52 and 52 disposed behind the tilted front face of the parts guide channel 31 at different heights or levels and spaced in the direction of conveyance of the fastener elements 2 by a predetermined distance L, and two light detectors 53, 53 disposed in confrontation with the light projectors 52, 52 for receiving light beams projected from the respective light projectors 52, 52.

Figure 3A:
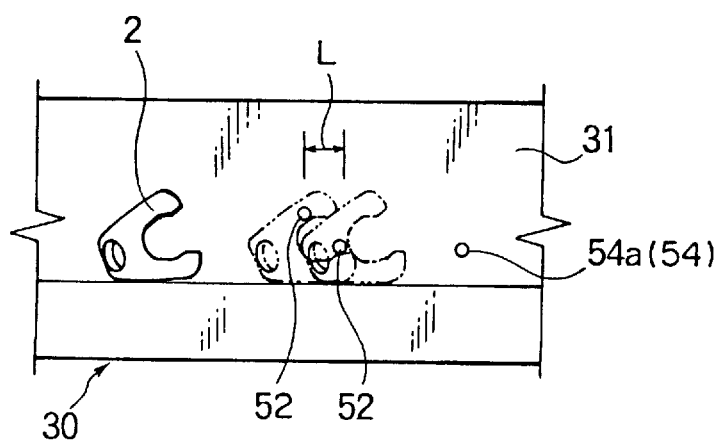
FIGS. 3A through 3C are views explanatory of the manner in which parts having undesired postures are discriminated by the first incorrectly-oriented-parts discriminating and removing means.
Figure 3B:
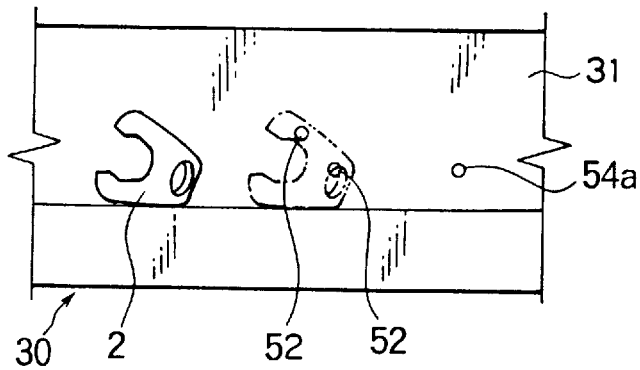
Figure 3C:
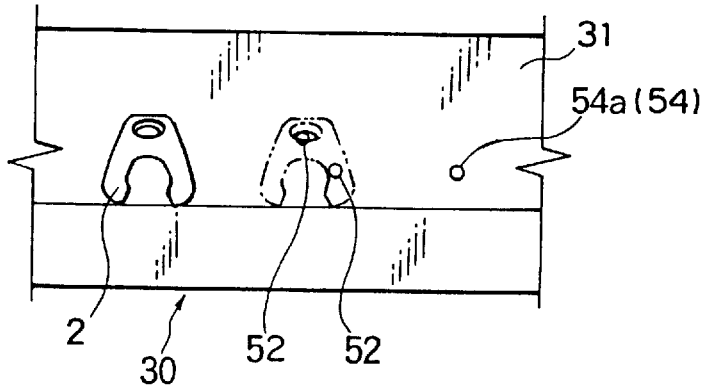

The respective levels of the first and second light projectors 52, 52 are determined such that the fastener elements 2 each having any of three different postures as shown in FIGS. 3A, 3B and 3C blocks the light beams from the first and second light projectors 52, 52 when they pass by the respective light projectors 52, 52. In combination with the levels, the distance L between the first and second projectors 52, 52 is determined such that a incorrectly oriented fastener element 2, namely, a fastener element 2 having an undesired posture or orientation, can be discriminated depending on a change in luminous energy received by the light detectors 53, 53 which may be caused when the incorrectly oriented fastener element 2 passes right by the first and second light projectors 52, 52. FIG. 3A shows fastener elements 2 being conveyed in a desired posture or orientation. In this case, the fastener element 2, as it passes right by the first and second light projectors 52, 52, do never block the light beams from the first and second light projectors 52, 52, simultaneously. Instead, it blocks the light beams from the respective projectors 52, 52 separately. On the other hand, when a fastener element 2 having an undesired posture or orientation shown in FIG. 3B or 3C passes right by the first and second light projectors 52, 52, the light beams from the respective light projectors 52, 52 are blocked simultaneously by the incorrectly oriented fastener element 2. The first and second light projectors 52', 52' are positioned in the manner described above.

When the light beams from the first and second light projectors 52, 52 are blocked simultaneously, the luminous energy detected by the light detector 53, 53 falls below a predetermined value. In this instance, the light detectors 53, 53 sends an electric signal to a non-illustrated control unit, which, after the lapse of a predetermined time, issues a command signal to open a non-illustrated valve to activate the air blast mechanism 54. Upon activation, the air blast mechanism 54 ejects compressed air toward the forthcoming or approaching fastener element 2 for a predetermined period of time. In the illustrated embodiment, the air blast mechanism 54 has an air blast hole 54a formed in the transfer chute 30 and opening to the parts guide channel 31. The air blasting time enough for the purpose is 0.08 to 0.15 second. By virtue of the first incorrectly-oriented-parts discriminating and removing means 50, the greater number of the incorrectly oriented fastener elements 2, as they travel down the parts guide channel 31, are discriminated among all the fastener elements 2 being fed in succession and then discharged from the parts guide channel 31 to the outside of the orientation parts feeder 1.

The air blasting in fact ensures a highly efficient operation for removing the incorrectly oriented parts. However, since the air blasting is continuously effected for the predetermined period of time, with the predetermined time interval or delay provided after the detection of an incorrectly oriented fastener element 2, notwithstanding that all the fastener elements 2 are not always conveyed at the same speed along the transfer chute 30 being vibrated, it may occur that the incorrectly oriented fastener element 2 passes the air nozzle 54a without being subjected to the compressed air ejected from the air nozzle 54a, or that a correctly oriented fastener element 2 coming just before or next to the incorrectly oriented fastener element 2 is blasted by the compressed air to assume an undesired posture or orientation.

To deal with this problem, the present invention further provides the second incorrectly-oriented-parts discriminating and removing means 55 disposed on the downstream side of the first incorrectly-oriented-parts discriminating and removing means 50. Since most incorrectly oriented fastener elements 2 have already been removed by the first incorrectly-oriented-parts discriminating and removing means 50, the role of the second incorrectly-oriented-parts discriminating and removing means 55 is to discriminate and remove the remaining incorrectly oriented fastener elements 2 with improved reliability. Accordingly, the second incorrectly-oriented-parts discriminating and removing means 55 may not have a high response speed but is required to have a mechanism which is capable of achieving a highly reliable discrimination and removing of the incorrectly oriented fastener elements 2 which have passed the first incorrectly-oriented-parts discriminating and removing means 50.

Figure 4:
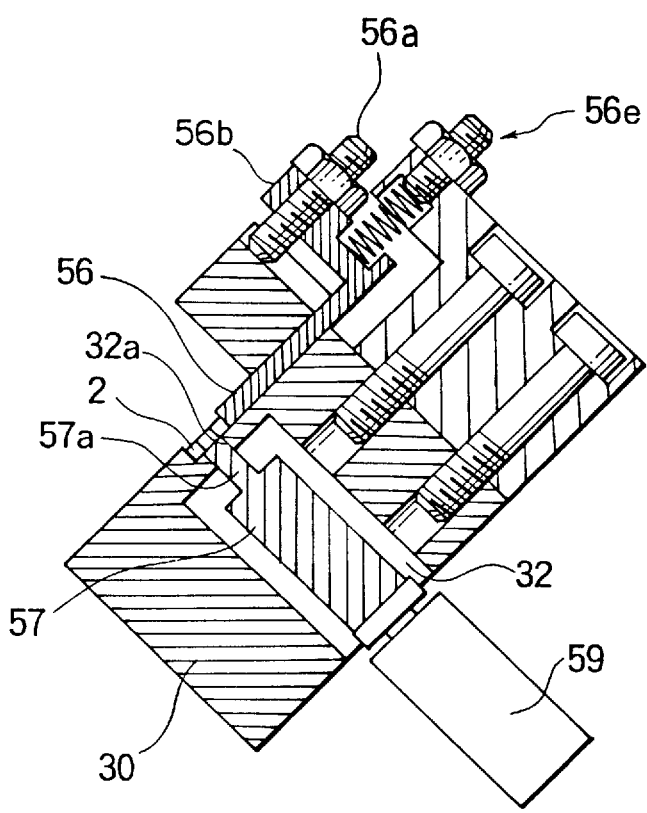
FIG. 4 is a cross-sectional view taken at a position in which a second incorrectly-oriented-parts discriminating and removing means of the orientation parts feeder is disposed.

In view of the foregoing requirement, the second incorrectly-oriented-parts discriminating and removing means 55 of the illustrated embodiment is composed of a mechanical discriminating and removing mechanism, such as shown in FIGS. 4 and 5A–5C. As shown in FIG. 4, the mechanical discriminating and removing mechanism includes a recess 32 extending from a back surface of the transfer chute 30 toward the parts guide channel 31 and terminating short of the parts guide channel 31, and a rectangular hole 32a extending from the bottom surface of the recess 32 to the front surface of the parts guide channel 31. The recess 32 movably receives therein an actuating rod 57 attached as a parts removing member, which is fixed to an outer end of the rod of an air cylinder 59, with a tip end portion 57a of the actuating rod 57 slidably received in the rectangular hole 32a. Further, a parts blocking member 56 is slidably mounted on the front surface of the parts guide channel 31 at a position located directly above the rectangular hole 32a in such a manner that the vertical position of the parts blocking member 56 can be adjusted by an adjusting screw 56a.

Figure 5A:
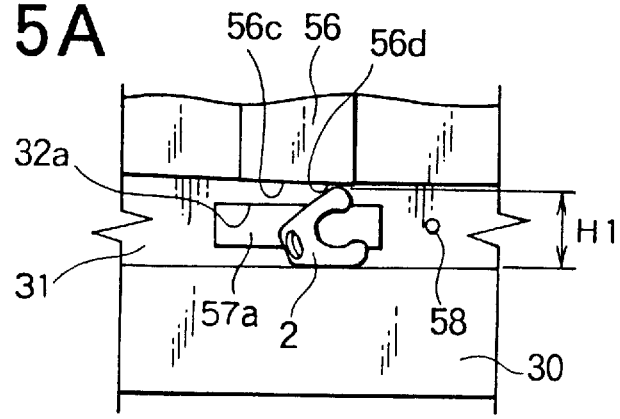
FIGS. 5A through 5C are views explanatory of the manner in which parts having undesired postures are discriminated by the second incorrectly-oriented-parts discriminating and removing means.

The parts blocking member 56 is a rectangular plate having at its upper end an integral projection 56b. The projection 56b has a screw hole in which the adjusting screw 56a is threaded. As shown in FIG. 5A, a lower surface of the rectangular plate-like parts blocking member 56 is composed of a taper surface 56c sloping down toward the direction of conveyance of the fastener elements 2, and a straight surface 56d extending continuously from a downstream end of the taper surface 56c.

In FIG. 4, reference character 56e denotes a resilient adjusting mechanism which includes a compression spring (not designated) for preventing the parts blocking member 56 from being moving upwardly by the incorrectly oriented fastener element 2. In the illustrated embodiment, a photoelectric parts detector 58 (FIG. 5A) is disposed on the downstream side of the rectangular hole 32a for a purpose described below. At the straight surface 56d, the parts blocking member 56 defines in the parts guide channel 31 a narrowed or restricted parts passage which has a width (height) which is slightly greater than the width (height) H1 of a fastener element 2 fed in the desired posture or orientation shown in FIG. 5A, but smaller than the width (height) H2 of a fastener element 2 fed in an undesired posture or orientation shown in FIG. 5B or FIG. 5C.

Figure 5B:
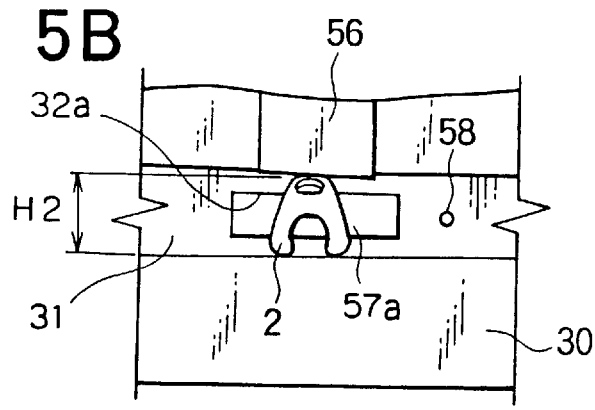
Figure 5C:
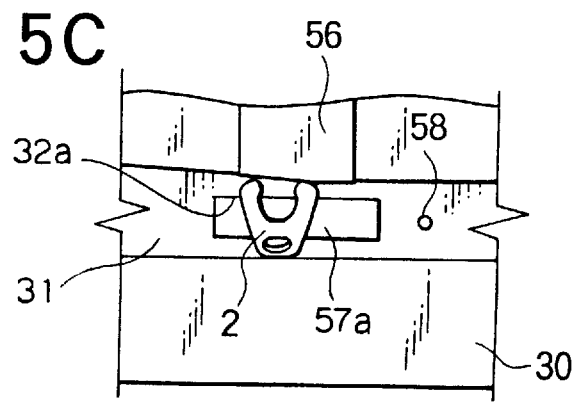

Referring now to FIGS. 5A–5C, description will be given of the operation of the second incorrectly-oriented-parts discriminating and removing means 55 for removing incorrectly oriented fastener elements 2. In the case where no electric signal indicative of the blocking of a light beam is sent from the detector 58 to the non-illustrated control unit within a predetermined time period, it is judged by the control unit that passage of a incorrectly oriented fastener element 2 is blocked by the parts blocking member 56. Based on this judgment, the control unit activates the air cylinder 59 in an extending direction whereupon the tip end portion 57a of the actuating rod 57 projects from the rectangular hole 32a into the parts guide channel 31. Thus, the fastener element 2 arrested by the parts blocking member 56 is thrust off from the parts guide channel 31 by the actuating rod 57.

The orientation parts feeder 1 of the construction described above operates as follows. At first, the electric motor 20 is driven to rotate the rotating drum 10 having a great number of fastener elements 2 therein. The fastener elements 2 held in the rotating drum 10 are scooped or taken up by the wing plates 13 of the rotating drum 10, and when the wing plates 13 reach an upper oblique position, the fastener elements 2 slide down the wing plates 13 and are received in an upstream portion of the parts guide channel 31 of the transfer chute 30 of which front surface is tilted backwardly at an angle of 45° to 60° degrees. In this instance, the transfer chute 30 is vibrated in its longitudinal direction by the vibrating unit 40, so the fastener elements 2 received in the parts guide channel 31 can be smoothly advanced along the parts guide channel 31. In the case where the fastener elements 2 supported on a guide surface of the parts guide channel 31 have the desired posture or orientation shown in FIG. 3A and FIG. 5A, none of them are detected as incorrectly oriented fastener elements by the first and second incorrectly-oriented-parts discriminating and removing means 50, 55. The correctly oriented fastener elements 2 are fed smoothly into the quarter-circular parts-feed-direction changing passage 60a, then transferred therefrom into the vertical chute 61, and finally delivered to the next processing operation. Throughout the conveyance, the fastener elements 2 keep their desired posture or orientation.

In the case where the fastener elements 2 while being fed down along the transfer chute 30 have an undesired posture or orientation shown in FIG. 3B or FIG. 3C, each of the incorrectly oriented fastener elements 2 simultaneously blocks both light beams from the first and second light projectors 52, 52 of the first incorrectly-oriented-parts discriminating and removing means 50. With the light beams thus blocked, luminous energy detected by the light detectors 53, 53 falls below a predetermined value. By virtue of the decrease of the detected luminous energy, the light detectors 53, 53 send an electric signal to the non-illustrated control unit which, after the lapse of the predetermined time period, issues a command signal to open the non-illustrated valve to activate the air blast mechanism 54. Upon activation of the air blast mechanism 54, compressed air is ejected from the air nozzle 54a toward the incorrectly oriented fastener element 2 for the predetermined time period of 0.08 to 0.15 second. By virtue of the first incorrectly-oriented-parts discriminating and removing means 50, a greater number of the incorrectly oriented fastener elements 2 are discriminated among a multiplicity of all the fastener elements 2 fed in succession and then removed from the parts guide channel 31 to the outside of the orientation parts feeder 1.

It may occur, however, that fastener elements 2 having the desired posture, coming just before or next to the incorrectly oriented fastener element 2 are either removed together with the incorrectly oriented faster element 2, or forcibly displaced or incorrectly oriented to assume an undesired posture, by the effect of the compressed air ejected from the first incorrectly-oriented-parts discriminating and removing means 50. In the latter case, after the forcibly incorrectly oriented fastener element 2 after having passed the first incorrectly-oriented-parts discriminating and removing means 50 passes the second incorrectly-oriented-parts discriminating and removing means 55, the incorrectly oriented fastener element 2 is discriminated and removed from the parts guide channel 31 with utmost reliability.

More specifically, when a incorrectly oriented fastener element 2, such as one having the posture shown in FIG. 5B or FIG. 5C, arrives at the second incorrectly-oriented-parts discriminating and removing means 55, a further advancing movement of this incorrectly oriented fastener element 2 is blocked by the parts blocking member 56. In this condition, an electric signal indicative of the blocking of an incident light is not sent to the control unit from the detector 58 disposed downstream of the parts blocking member 56. If the detection signal from the detector 58 to the control unit is not sent for a predetermined time period, it is judged by the control unit that passage of the incorrectly oriented fastener element 2 is blocked by the parts blocking member 56. Based on this judgment, the control unit activates the air cylinder 59 in its extending direction to project the tip end portion 57a of the actuating rod 57 outwardly from the rectangular hole 32a into the parts guide channel 31, more particularly, the restricted passage defined by the parts blocking member 56, with the result that the fastener element 2 arrested by the parts blocking member 56 is thrust off from the parts guide channel 31.

The orientation parts feeder 1 may further include a parts orienting means 70, which is shown in FIG. 6A–6E disposed in the parts guide channel 31 at an upstream side of the first incorrectly-oriented-parts discriminating and removing means 50. The parts orienting means 70 is so constructed as to correct the posture of an incorrectly oriented fastener element 2 into a predetermined desired posture while the fastener element 2 is fed along the parts guide channel 31 of the transfer chute 30, as shown in FIGS. 6B–6E. In the illustrated embodiment, the parts orienting means 70 is composed of an air blast mechanism. The fastener elements 2, as they are slid down along the transfer chute 30 toward the parts orienting means 70, have one of four postures shown in FIGS. 6A, 6B, 6C and 6D, respectively. Now, assuming that the posture in FIG. 6(A) is a desired posture, those fastener elements 2 having other postures shown in FIGS. 6B–6D are oriented to assume the desired posture of FIG. 6A by the parts orienting means 70.

In the illustrated embodiment, the air blast mechanism constituting the parts orienting means 70 includes a series of non-illustrated air nozzles formed in a bottom surface of the parts guide channel 31 of the transfer chute 30. The air nozzles are inclined in such a manner that streams of air ejected from the air nozzles at a predetermined pressure are directed upwardly and obliquely at an appropriate angle as indicated by the arrows shown in each of FIGS. 6A–6E. In the case where the fastener element 2 has the desired posture shown in FIG. 6A, the air ejected from the lower left of the fastener element 2 flows upwardly along an upper surface of an inclined leg of the fastener element 2 and, hence, the air has no function to overturn the fastener element 2. However, for the fastener element 2 having the posture shown in FIG. 6B, the air ejected overturns the fastener element 2 in the forward or downstream direction with its legs directed leftwise of the figure so as to assume a horizontal recumbent posture as shown in FIG. 6C, then turns the fastener element 2 clockwise about its head portion to assume an inverted posture shown in FIG. 6D, and by the air further ejected from the lower left, finally further turns the fastener element 2 clockwise about the head portion to assume another horizontal recumbent posture shown in FIG. 6E where the fastener element 2 has the desired posture shown in FIG. 6A.

Figure 7:
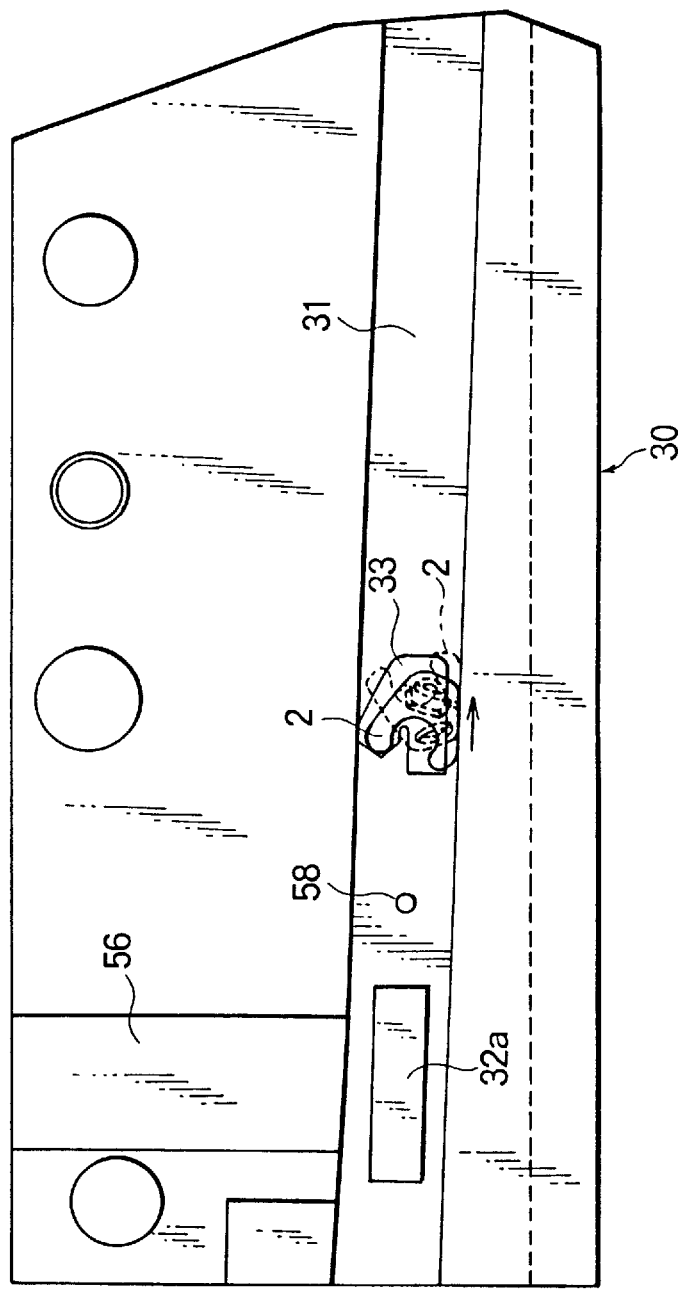
FIG. 7 is a view illustrative of the manner in which parts having undesired postures can be removed by a parts discharge hole provided at a downstream side of the second incorrectly-oriented-parts discriminating and removing means.

It is further possible according to the present invention to provide a means for removing incorrectly oriented fastener elements 2 which have not been removed even by the second incorrectly-oriented-parts discriminating and removing means 55. One example of such means comprises, as shown in FIG. 7, a parts discharge hole 33 provided for discharging incorrectly oriented fastener elements 2 which have not been removed by the second incorrectly-oriented-parts discriminating and removing means 55, by allowing them to fall down by their own weight from the parts discharge hole 33 to the outside of the transfer chute 30.

As previously described with reference to FIGS. 5A–5C, the second incorrectly-oriented-parts discriminating and removing means 55 is so constructed as to detect and remove a fastener element 2 having an upright posture shown in FIG. 5B and a fastener element 2 having an inverted posture shown in FIG. 5C. However, when a fastener element 2 has a horizontal recumbent posture as shown in FIG. 6C which is oriented in the opposite direction to that of the desired posture of the fastener element 2 shown in FIG. 5A, the fastener element 2 of the undesired recumbent posture can be neither detected nor removed by the second incorrectly-oriented-parts discriminating and removing means 55. To deal with this problem, the parts discharge hole 33 is formed in the tilted front surface of the parts guide channel 31 at a position downstream of the second incorrectly-oriented-parts discriminating and removing means 55, such as shown in FIG. 7, so that the fastener element 2 sliding down the vibrating chute 30 with the posture shown in FIG. 6C is automatically received in the parts discharge hole 33 and hence allowed to fall down by its own weight from the parts discharge hole 33 in the parts guide channel 31 of the chute 30.

The parts discharge hole 33 is substantially similar in shape as the fastener element 2 fed in the undesired posture of FIG. 6C and is larger in size than the same fastener element 2. With the parts discharge hole 33 thus profiled, a fastener element 2 having a desired posture indicated by the broken line shown in FIG. 7 can pass the parts discharge hole 33 smoothly while it is supported by the guide surfaces of the parts guide channel 31. On the other hand, when the fastener element 2 sliding down the transfer chute 30 in the undesired recumbent posture of FIG. 6C arrives at the parts discharge hole 33, it loses a support of the guide surfaces of the parts guide channel 31 and hence fall down by its own weight from the parts discharge hole 33 to the outside of the parts guide channel 31. Thus, the fastener elements 2 of the undesired recumbent posture which have not been removed by the second incorrectly-oriented-parts discriminating and removing means 55 can be removed completely.

It is apparent from the foregoing description that the present invention is not limited to the illustrated embodiments. For example, the first and second incorrectly-oriented-parts discriminating and removing means 50, 55, the parts orienting means 70, and the parts discharge hole 33 can be modified in various ways according to the type and shape of parts used.

As described above, according to the orientation parts feeder 1 of this invention, a great number of parts (fastener elements 2, for example) held in a substantially horizontally supported rotating drum 10 are scooped or taken up by a plurality of wing plates 13 provided on a cylindrical inner wall of the rotating drum 10. Then the parts are dropped onto a guide surface of a longitudinal parts guide channel 31 in a linear transfer chute 30 while being vibrated in the longitudinal direction. Thereafter, the parts are positively advanced down along the vibrating transfer chute 30. The orientation parts feeder 1 thus constructed has an extremely high conveyance speed.

The orientation parts feeder 1 of this invention further includes a first and a second incorrectly-oriented-parts discriminating and removing means 50, 55 disposed in succession on a downstream end portion of the transfer chute 30. The first incorrectly-oriented-parts discriminating and removing means 50 has a high speed of response and is able to discriminate and remove a greater number of the incorrectly oriented parts with high efficiency. The second incorrectly-oriented-parts discriminating and removing means 55, which is disposed downstream of the first incorrectly-oriented-parts discriminating and removing means 50, is not so good in responsibility as the first incorrectly oriented discriminating and removing means 50 but is able to mechanically and reliably remove the incorrectly oriented parts which have not been removed by the first incorrectly-oriented-parts discriminating and removing means 50. Thus, any part having a undesired posture can be almost perfectly discriminated and removed among from parts fed down along the vibrating transfer chute 30 at high speeds.

In addition to the foregoing features, the orientation parts feeder 1 of this invention may further include a parts orienting means 70 disposed on the transfer chute 30 at an upstream side of the first incorrectly-oriented-parts discriminating and removing means 50, and a parts discharge hole 33 formed in the transfer chute 30 at a downstream side of the second incorrectly-oriented-parts discriminating and removing means 55 for receiving parts of an undesired posture and thus allowing them to fall down by their own weights to the outside of the transfer chute 30. In this instance, the parts are all but oriented into a desired posture by the parts orienting means before they reach the first incorrectly-oriented-parts discriminating and removing means 50, and the parts with the undesired posture which have passed even the second incorrectly-oriented-parts discriminating and removing means 55 can removed with reliability by the parts discharge hole 33.

Obviously, various minor changes and modifications of present invention are possible in the light of the above teaching. It is therefore to be understood that the invention may be practiced otherwise than as specifically described.

What is claimed is:

1. An orientation parts feeder for successively feeding parts having irregular cross sections while keeping them in preferred, uniform postures, comprising:

a transfer chute of an elongated rectangular square bar having a longitudinal parts guide channel in one side;

a vibration generator supporting thereon the transfer chute for vibrating the transfer chute in a longitudinal direction thereof;

a first incorrectly-oriented-parts discriminating and removing mechanism disposed on the transfer chute including two parts detecting sensors and an air blast mechanism, the two parts detecting sensors and providing variable outputs depending upon the orientation of a part being sensed wherein the part being sensed is ejected from the transfer chute by the air blast mechanism, based upon the outputs of the two parts detecting sensors, if the part being sensed has an undesirable orientation; and a second incorrectly-oriented-parts discriminating and removing mechanism including a parts blocking member disposed in the parts guide channel, a second part detecting sensor located downstream of the parts blocking member and an actuable mechanical arm, wherein the parts blocking member prevents passage of a part orientation through the parts guide channel and, when detection of the arrival of a part by the second part detecting sensor does not occur within a predetermined time period, the part having an undesirable orientation is ejected from the transfer chute by the actuable mechanism arm.

2. An orientation parts feeder as claimed in claim 1, further comprising:

a parts orienting mechanism disposed on the parts guide channel upstream of the first and second incorrectly-oriented-parts discriminating and removing mechanisms, the parts orienting mechanism including directional air flow for positioning the parts into a preferred orientation.

3. An orientation parts feeder as claimed in claim 1, further comprising:

a parts discharge hole formed in a guide surface of the parts guide channel at a position downstream of the second incorrectly-oriented-parts discriminating and removing mechanism, wherein parts having undesirable orientations which were not removed by the second incorrectly-oriented-parts discriminating and removing mechanism are allowed to fall through the parts discharge hole by their own weights.

4. An orientation parts feeder as claimed in claim 1, further comprising:

an arcuate parts-feed-direction changing passage connected between a downstream end of the transfer chute and a vertical chute for conveyance of the parts to a next processing operation.

5. An orientation parts feeder as claimed in claim 4, wherein the arcuate parts-feed-direction changing passage is part of a circular groove formed in a curved surface of a hollow circular truncated cone, the arcuate parts-feed-direction changing passage being provided by dividing the hollow circular truncated cone into a plurality of segment members each having an arcuate groove.

* * * * *